US007460016B2

(12) United States Patent
Sorenson, Jr. et al.

(10) Patent No.: US 7,460,016 B2
(45) Date of Patent: Dec. 2, 2008

(54) RADIO FREQUENCY IDENTIFICATION (RFID) SYSTEM FOR A FORKLIFT

(75) Inventors: Richard W. Sorenson, Jr., Atlanta, GA (US); Ernest Lee Son, Roswell, GA (US); Paul Edward Wiesner, Lawrenceville, GA (US); William H. Roeder, Norcross, GA (US); Michael Sayre Clott, Marietta, GA (US)

(73) Assignee: EMS Technologies, Inc., Norcross, GA (US)

( * ) Notice: Subject to any disclaimer, the term of this patent is extended or adjusted under 35 U.S.C. 154(b) by 349 days.

(21) Appl. No.: 11/387,978

(22) Filed: Mar. 24, 2006

(65) Prior Publication Data

US 2006/0255954 A1    Nov. 16, 2006

Related U.S. Application Data

(60) Provisional application No. 60/680,925, filed on May 13, 2005, provisional application No. 60/718,947, filed on Sep. 20, 2005, provisional application No. 60/733,295, filed on Nov. 3, 2005.

(51) Int. Cl.
    *G08B 13/14* (2006.01)

(52) U.S. Cl. ................ 340/572.7; 340/693.9; 343/713; 343/878

(58) Field of Classification Search .............. 340/572.1, 340/572.7, 693.9; 235/385; 705/28; 343/872, 343/878, 912, 713
See application file for complete search history.

(56) References Cited

U.S. PATENT DOCUMENTS

| 6,166,638 | A | * | 12/2000 | Brady et al. | ............. 340/572.7 |
| 6,669,089 | B2 | * | 12/2003 | Cybulski et al. | ............. 235/385 |
| 2004/0102870 | A1 | * | 5/2004 | Andersen et al. | ......... 340/572.8 |
| 2005/0076816 | A1 | * | 4/2005 | Nakano | ................... 108/51.11 |
| 2005/0200457 | A1 | * | 9/2005 | Bridgelall et al. | .......... 340/10.3 |

* cited by examiner

*Primary Examiner*—Thomas J Mullen
(74) *Attorney, Agent, or Firm*—Hogan & Hartson, LLP (57) ABSTRACT

In one of several embodiments, an RFID system for a forklift incorporates a metal plate to which is attached an electronic circuit assembly. Also attached to the metal plate, is an antenna assembly housing an RFID interrogator antenna and/or a wireless local area network (WLAN) antenna. The metal plate operates as a ground plane to the antenna assembly and also serves as a mounting plate for mounting the RFID system on a sideshifter or a carriage of the forklift.

27 Claims, 10 Drawing Sheets

```
┌─────────────────────────────────────────────┐
│                                         605 │
│   attaching to a metal plate, an antenna    │
│   assembly of an RFID system, the antenna   │
│   assembly containing an RFID interrogator  │
│   antenna and/or a local area network (LAN) │
│                   antenna                   │
└─────────────────────────────────────────────┘
                      │
                      ▼
┌─────────────────────────────────────────────┐
│                                         610 │
│   mounting the metal plate on a carriage    │
│   or a sideshifter of a forklift using a    │
│   projecting portion of the metal plate,    │
│   the projecting portion overlapping at     │
│   least a portion of an upper horizontal    │
│   surface of the carriage or the sideshifter.│
└─────────────────────────────────────────────┘
```

FIG. 6

RADIO FREQUENCY IDENTIFICATION (RFID) SYSTEM FOR A FORKLIFT

PRIORITY CLAIM

The present application claims priority benefit of U.S. provisional patent applications Ser. No. 60/680,925 filed on May 13, 2005; Ser. No. 60/718,947 filed on Sep. 20, 2005; and Ser. No. 60/733,295 filed on Nov. 3, 2005.

DESCRIPTION OF THE RELATED ART

A radio frequency identification (RFID) system typically uses an RFID tag reader to query an RFID tag attached to an object. The RFID tag provides certain information associated with the tagged object. RFID systems are used in diverse applications such as product tracking, vehicle identification for toll-fee collection purposes, theft prevention, and warehouse inventory control. Each of these applications presents a unique set of problems that have to be resolved to ensure efficient operation of the RFID system.

With specific reference to warehouse inventory control, the RFID system has to efficiently operate in a harsh operating environment that is typical of a warehouse. RFID system components are installed at various locations in the warehouse. Some of these locations are stationary mounting locations, such as that of a RFID tag reader installed on a post located adjacent to a conveyor belt. Other locations are mobile mounting locations, such as that of an RFID tag reader installed on a forklift.

The RFID tag reader mounted on the forklift is operated to communicate with RFID tags attached to various objects transported by the forklift as well as stationary objects that may be located on a warehouse shelf. Several factors have to be considered in the design as well as the mounting of various components associated with the RFID tag reader.

For example, one or more radio-frequency (RF) antennas associated with the RFID tag reader have to be designed to have unique antenna beam patterns optimized for specific functions. Addressing this particular aspect, an RFID tag reader includes an RFID interrogator antenna for communicating interrogation signals to RFID tags attached to one or more objects. The antenna pattern of the RFID interrogator antenna is typically a directional beam directed towards objects containing RFID tags. When such objects are located on the forks of the forklift, the beam of the RFID interrogator antenna has to be efficiently directed to read an individual RFID tag without interference from adjacent RFID tags. Consequently, such a beam is designed to have a narrow, directional beam pattern directed towards the front of the forklift.

The RFID tag reader may further include a communications antenna used to communicatively couple the RFID tag reader to an RFID controller system. In contrast to the beam characteristic of the RFID interrogator antenna, the communications antenna may be designed to have an omni-directional beam characteristic more suited to provide communications between the RFID tag reader mounted on the forklift as it moves around the warehouse and an RFID controller system mounted at a stationary location away from the forklift.

Mounting the RFID tag reader upon the forklift further involves several additional operational as well as logistical considerations. For example, prior to installation of the RFID tag reader, an acceptable mounting location has to be identified such that installation and operation of the RFID tag reader will not interfere with, nor be affected by, the operation of the forklift. Also to be considered is the cost of mounting the RFID tag reader upon the forklift. The cost of mounting the RFID tag reader may be broken down into several contributory costs, such as installation cost, forklift downtime cost, and forklift modification cost. Obviously, these costs become significant when the installation has to be carried out on a large number of forklifts.

While installation cost and forklift downtime cost are self-explanatory, the aspect of forklift modification cost requires further elaboration. Forklift modification cost relates to the cost of hardware modification carried out upon the forklift specifically for the purposes of mounting the RFID the reader. Hardware modification cost includes the cost of acquiring mounting fixtures as well as the labor cost associated with installing the mounting fixtures. Labor cost becomes especially significant when the mounting fixture is somewhat long-term in nature, for example, a mounting fixture that is welded on to a frame of the forklift.

An additional factor that plays a role in mounting an RFID tag reader upon a forklift relates to the ease with which the unit can be dismounted from the forklift and re-mounted on a different forklift. When such a transfer is carried out, it is desirable that the dismounting process be quick and cost efficient, preferably carried out in a manner that does not leave behind residual mounting hardware on the forklift. Unfortunately, in many cases, the mounting fixture that is welded on to the frame of the forklift is not dismantled when the RFID tag reader is removed.

Based on the shortcomings mentioned above, an unaddressed need exists in the industry for a forklift-based RFID system that provides desirable features such as efficient operational characteristics, ease of mounting, ease of dismounting, and cost efficiency.

SUMMARY

In one exemplary embodiment in accordance with the invention, an RFID system for a forklift incorporates a metal plate to which is attached an electronic circuit assembly. Also attached to the metal plate, is an antenna assembly housing an RFID interrogator antenna and/or a wireless local area network (WLAN) antenna. The metal plate operates as a ground plane of the antenna assembly and also serves as a mounting plate for mounting the RFID system on a sideshifter or a carriage of the forklift.

Clearly, some alternative embodiments may exhibit advantages and features in addition to, or in lieu of, those mentioned above. It is intended that all such alternative embodiments be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments in accordance with the invention generally describe a radio frequency identification (RFID) system having a metal plate that facilitates a desired beam pattern for an antenna assembly attached to the metal plate. The metal plate additionally serves as a mounting plate to mount the RFID system on a carriage or a sideshifter of the forklift. Also described are methods of mounting and dismounting the RFID system that provide operational as well as cost advantages.

Several aspects of this invention are further described in co-pending and commonly assigned U.S. patent application Ser.No. 11/369,005 filed Mar. 7, 2006, entitled "Removable Mount for Mounting an Electronic System Component on a Forklift," which is incorporated herein in its entirety by reference.

Figure 1:
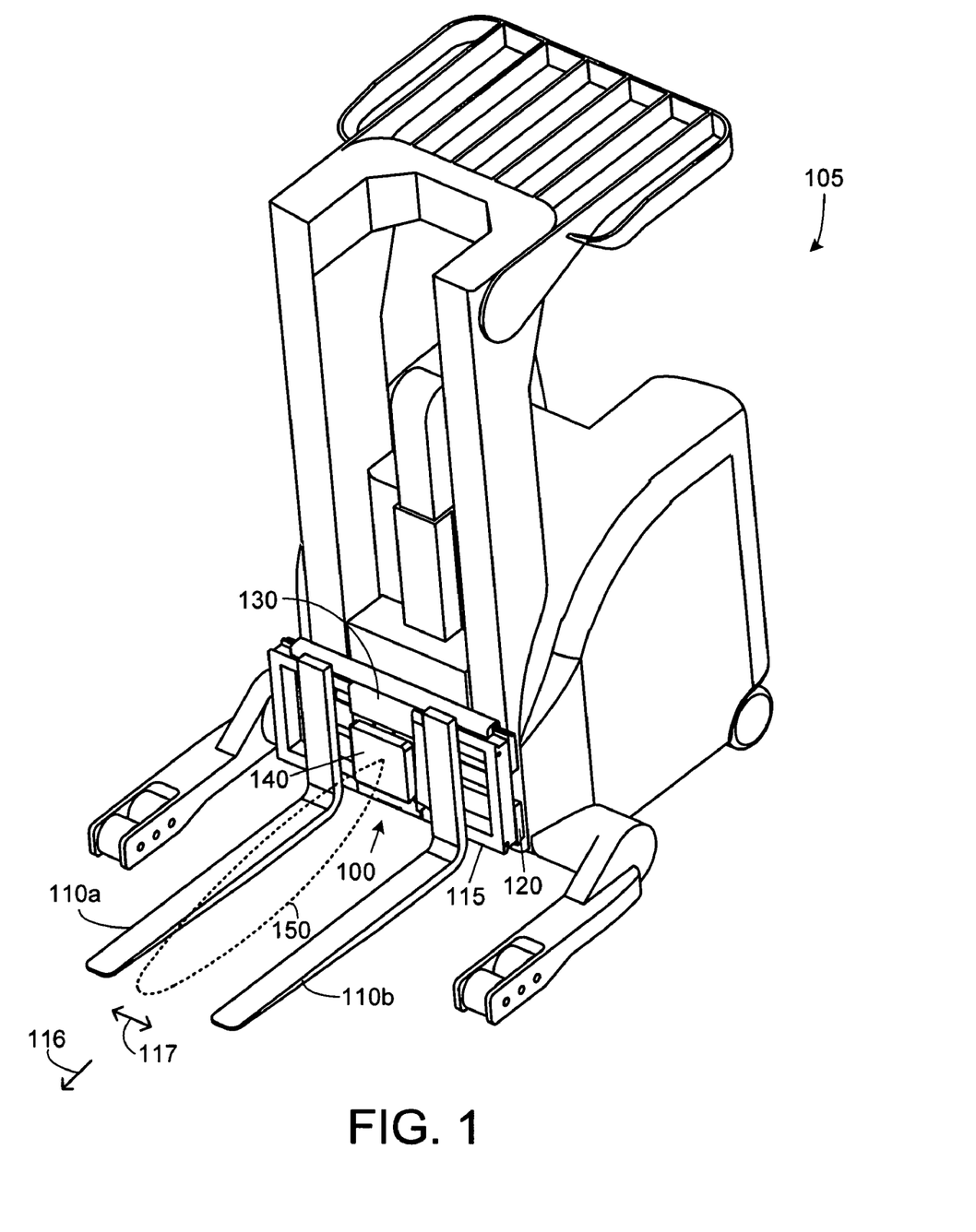
FIG. 1 shows an exemplary embodiment in accordance with the invention of an RFID system for a forklift.

FIG. 1 shows a first exemplary embodiment in accordance with the invention of an RFID system 100 mounted on a forklift 105. Forklift 105 is used here merely for purposes of illustration and it will be understood that in various embodiments, the RFID system is mountable on a variety of forklifts. Forklift 105 has a pair of forks 110a and 110b that are used to lift a load for transporting the load from one location to another. The term "fork" may be alternatively referred to as a "tine." Typically, an operator drives forklift 105 in the direction indicated by arrow 116 and inserts forks 110a and 110b under the load before raising forks 110a and 110b for transporting the load. Sometimes during this operation, forks 110a and 110b may not be positioned at an appropriate point to insert them below the load, which is usually supported on a pallet. Consequently, the operator has to drive back and forth to reposition forklift 105. However, this back and forth driving can be eliminated by using an additional fixture, referred to in the art as a "sideshifter," which provides bilateral movement in the direction indicated by bi-directional arrow 117. The sideshifter allows the operator to reposition forks 110a and 110b laterally without having to travel back and forth to do so.

An exemplary sideshifter 115 is shown in FIG. 1. Sideshifter 115 is typically mounted on a mounting frame that for purposes of description is referred to herein as a carriage 120. Sideshifter 115, which is slideably mounted on an upper horizontal lip of carriage 120 can be moved bilaterally by an operator of forklift 105, in a plane parallel to a horizontal face of carriage 120 for lifting a load.

Similar to carriage 120, sideshifter 115 also has an upper horizontal lip on which is installed the pair of forks 110a and 110b. Typically, this installation is carried out by an installer who manually engages an inverted J-shaped part located on the back surface of a first tine, fork 110a for example, upon the upper horizontal lip of sideshifter 115 at one end of sideshifter 115. The first tine is then manually moved by the installer, to a suitable position along the length of the upper horizontal lip. The second tine is then installed in a similar manner and positioned with a suitable spacing between the two tines.

Typically, the horizontal upper lip of carriage 120 and sideshifter 115 resemble one another in dimension and shape. Similarly, there are several other components of carriage 120 and sideshifter 115 that resemble one another in dimension and shape. For example, both carriage 120 and sideshifter 115 contain identical threaded holes at various locations.

Consequently, RFID system 100 may be interchangeably mounted on either sideshifter 115 or on carriage 120. In the exemplary embodiment shown in FIG. 1, RFID system 100 is shown mounted on a front surface of sideshifter 115. It will be understood that the description provided below is equally pertinent to installing RFID system 100 upon carriage 120.

RFID system 100 incorporates various types of mounting hardware, such as a metal plate 130 and a threaded bolt (not shown), that are used for readily mounting RFID system 100 upon sideshifter 115 and also for dismounting RFID system 100 from sideshifter 115 without leaving behind any residual mounting hardware.

Metal plate 130 has a front major surface to which is attached, an antenna assembly 140 of RFID system 100. Antenna assembly 140 comprises a housing that encloses and mechanically protects an RFID interrogator antenna and a wireless local area network (WLAN) antenna, the housing being transparent to radio frequency (RF) signals. Metal plate 130 operates as a reflective ground plane that prevents antenna beam radiation towards the chassis of forklift 105 and thereby assists in forming a directional beam pattern 150 for an RFID interrogator antenna contained in antenna assembly 140. Directional beam pattern 150 is pointed towards the area where one or more tagged objects are placed on forks 110a and 110b, thereby optimizing tag reading capabilities of RFID system 100. Metal plate 130 may be alternatively pointed in other selected directions.

Typically metal plate 130 is mounted on metal parts of sideshifter 115 or carriage 120, thereby being electrically connected to a chassis ground of forklift 105. The chassis ground in one case is limited to the metal portions of sideshifter 115 or carriage 120 while in another case the chassis ground includes several major metal portions of the main cab of forklift 105.

Also mounted on metal plate 130 is an electronic system component of RFID system 100. In this example, the electronic system component is an RFID tag reader module (not shown) mounted on the rear major surface. The RFID tag reader module as well as antenna assembly 140 will be described in more detail using FIG. 2 below. Although not shown, a power supply module, a rechargeable power supply module for example, may also be mounted on either side of the plate. The electronic system component of RFID system 100 may be powered by the power supply module or alternatively powered by a battery system of the forklift.

Metal plate 130 further contains a slot (not shown) configured for accommodating a fastener for anchoring metal plate 130 to sideshifter 115. In this exemplary embodiment the fastener is the threaded bolt, which is inserted through the slot and mated with a threaded aperture (not shown) located in sideshifter 115.

The threaded aperture can be implemented in several alternative ways. For example, in a first embodiment, the threaded aperture is intentionally made in sideshifter 115 for the purposes of mounting the metal plate 130. Consequently, this threaded aperture is an aftermarket modification that is carried out by an owner of forklift 105 or a vendor, for example, at a suitable location on sideshifter 115. Anchoring metal plate 130 in this manner by using the threaded aperture in sideshifter 115 eliminates the need for adding intrusive mounting hardware, such as a welded bracket, a welded bolt, or a welded hook.

The threaded aperture can be left undisturbed in the forklift without any serious inconvenience when RFID system 100 is dismounted from forklift 105. Consequently, certain dismounting costs such as those associated with the removal of welded parts are eliminated.

In a second exemplary embodiment, the threaded aperture is a pre-existing aperture in an original equipment manufacturer (OEM) sideshifter or an OEM carriage. In the context of this disclosure, the term "OEM" refers to a component that has been unmodified since the time the component was originally manufactured. Consequently, the threaded aperture of the second exemplary embodiment is an aperture that is provided by the original manufacturer and not one that is made by the vendor or the owner of forklift 105, for example.

Figure 2:
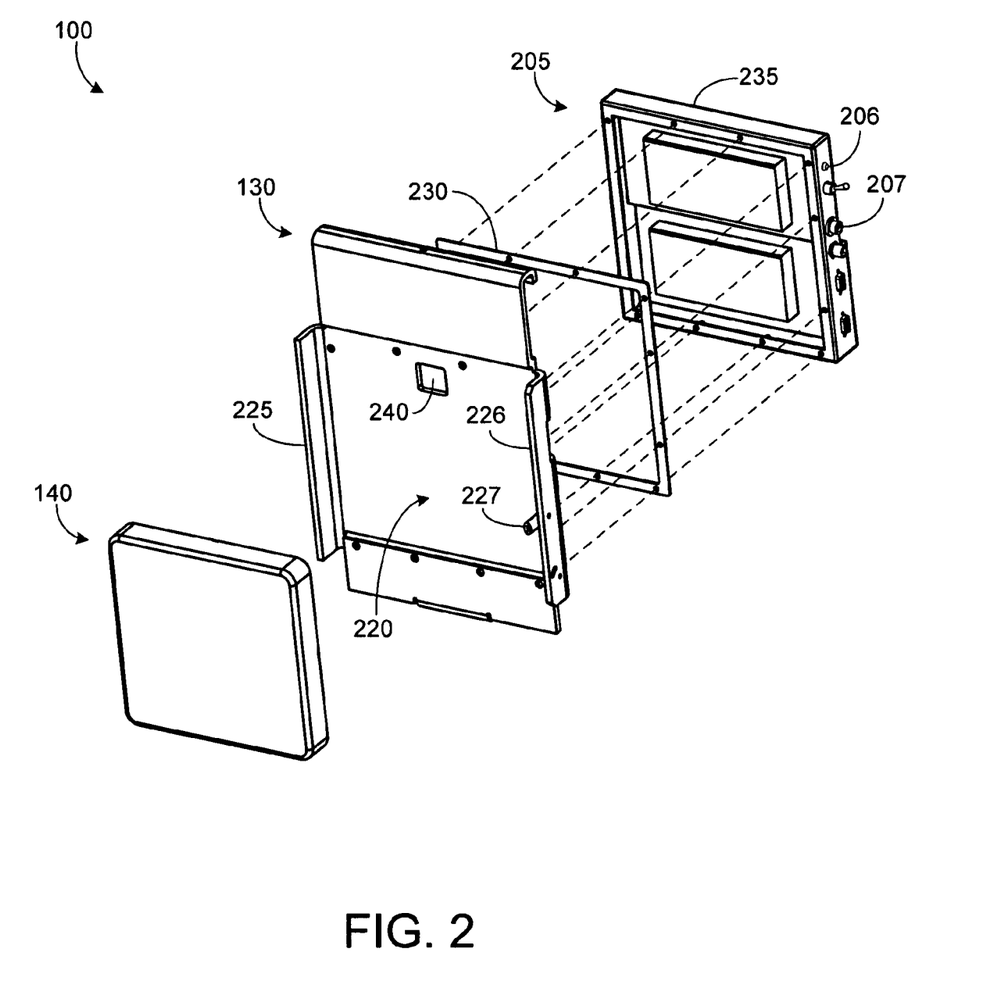
FIG. 2 shows an exploded view of some components of the RFID system of FIG. 1.

FIG. 2 shows an exploded view of metal plate 130 together with assembly details for mounting RFID system components, which, in this example, include: antenna assembly 140, gasket 230, and RFID tag reader module 205.

RFID tag reader module 205 contains an electronic circuit associated with reading RFID tags. The electronic circuitry is typically assembled on a printed circuit board (PCB), which is assembled upon a back-plate (not shown) that is part of a mounting frame 206 of RFID tag reader module 205. In this exemplary embodiment, RFID tag reader module 205 does not include a front-plate.

RFID tag reader module 205 is generally attached to metal plate 130 by using gasket 230, which provides various mechanical as well as electronic advantages. When attached in this manner, metal plate 130 operates as a lid of RFID tag reader module 205. Metal plate 130 may be further used as a lid for antenna assembly 140 that is mounted on surface 220 of metal plate 130.

Consequently, metal plate 130 is optionally operative as a lid to RFID tag reader module 205, antenna assembly 140, and any other module that may be optionally attached to either major surface of metal plate 130. One or more gaskets may be optionally provided or omitted when metal plate 130 is operative as a lid. Furthermore, metal plate 130 comprises an opening 240 through which a connecting cable can be inserted to electrically couple the antenna assembly 140 to the electronic circuitry of the RFID tag reader module 205.

Metal plate 130 includes a vertical flange 225 that is configured to block an object from impacting the antenna assembly 140 or other parts mounted on the front surface of metal plate 130. Vertical flange 226 serves a similar purpose. Additionally, one or both vertical flanges 225 or 226 may be used for optionally mounting a sensor, for example an opto-electronic sensor 227. Opto-electronic sensor 227 may be optionally used to detect the presence of an object when placed on forks 110a and 110b thereby facilitating an interrogation process whereby RFID tag reader module 205 interrogates a tag, if a tag is present in the placed object.

Figure 3A:
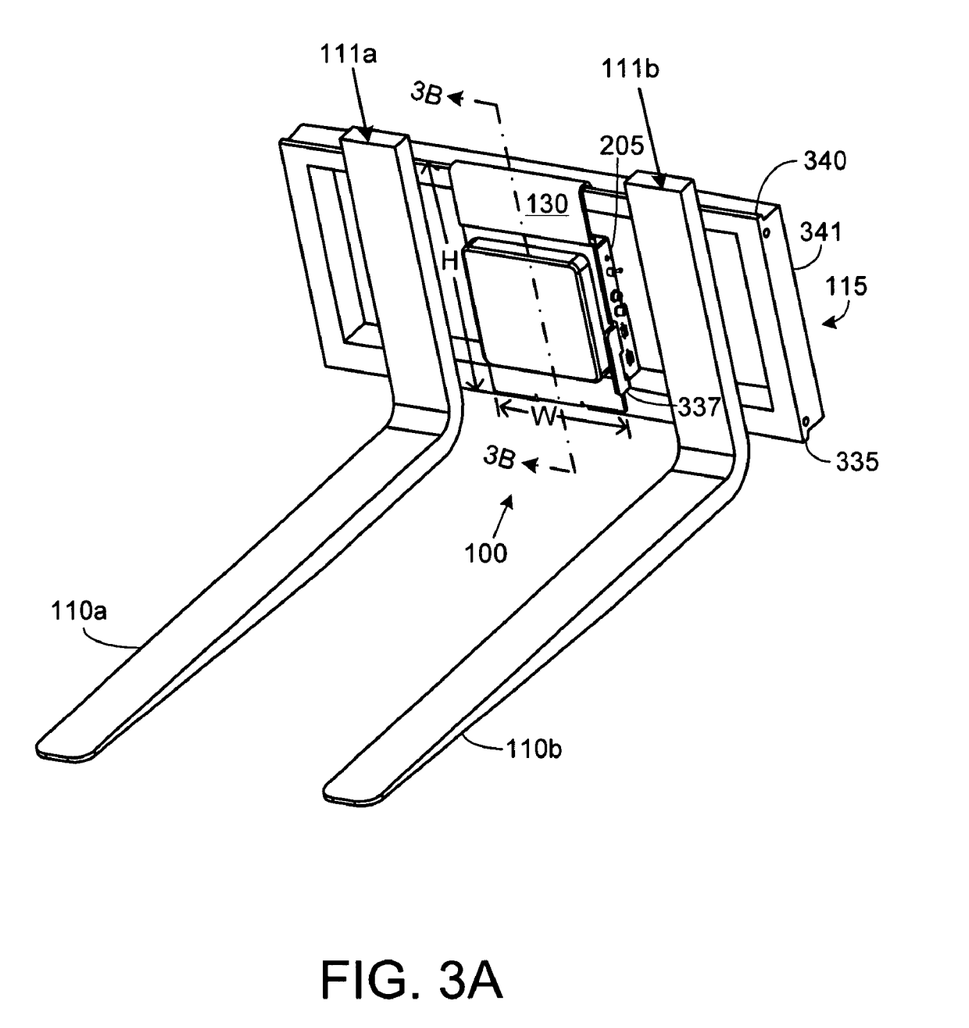
FIG. 3A shows a first perspective view of the RFID system of FIG. 1 that uses a first exemplary metal plate for mounting the RFID system on a sideshifter of the forklift.

FIG. 3A shows RFID system 100 mounted on sideshifter 115. In this exemplary embodiment, RFID system 100 is mounted on a primary frame 341 of sideshifter 115. Primary frame 341 has a rectangular profile and includes two horizontal lips—an upper horizontal lip 340 and a lower horizontal lip 335. Upper horizontal lip 340 is located on an upper surface of an upper horizontal member and lower horizontal lip 335 is located on a bottom surface of a lower horizontal member of sideshifter 115. RFID system 100 is mounted on sideshifter 115 by using a first projecting portion 362 (shown in FIG. 3B) of metal plate 130. The projecting portion is dimensioned to overlap at least a portion of an upper surface of upper horizontal lip 340. In this exemplary embodiment, the first projecting portion is an inverted J-shaped part which will be described further using FIGS. 3B and 3C.

RFID system 100 may be alternatively, or additionally, mounted on sideshifter 115 by using a second projecting portion (not shown) of metal plate 130 that is dimensioned to overlap at least a portion of a lower surface of lower horizontal lip 335. In this exemplary embodiment, the second projecting portion is a flange (not shown), which will be described further using FIGS. 3B and 3C.

The aspect ratio of metal plate 130 is selected such that vertical dimension H of metal plate 130 exceeds the width W of metal plate 130. H is measured from the top edge to the bottom edge of metal plate 130 and width W is measured from one vertical edge to the other vertical edge of metal plate 130. Vertical dimension H may be selected to be slightly greater than a vertical dimension measured between the upper surface of upper horizontal lip 340 and the lower surface of lower horizontal lip 335 of sideshifter 115. Horizontal dimension W may be selected to accommodate a minimum acceptable spacing between the pair of tines 110a and 110b when the pair of tines 110a and 110b is operated by an operator of forklift 105 (not shown) to be brought closer to one another. In a preferred embodiment of the present invention, the height (H) of the metal plate 130 exceeds two times the width (W) of the metal plate 130

Figure 3B:
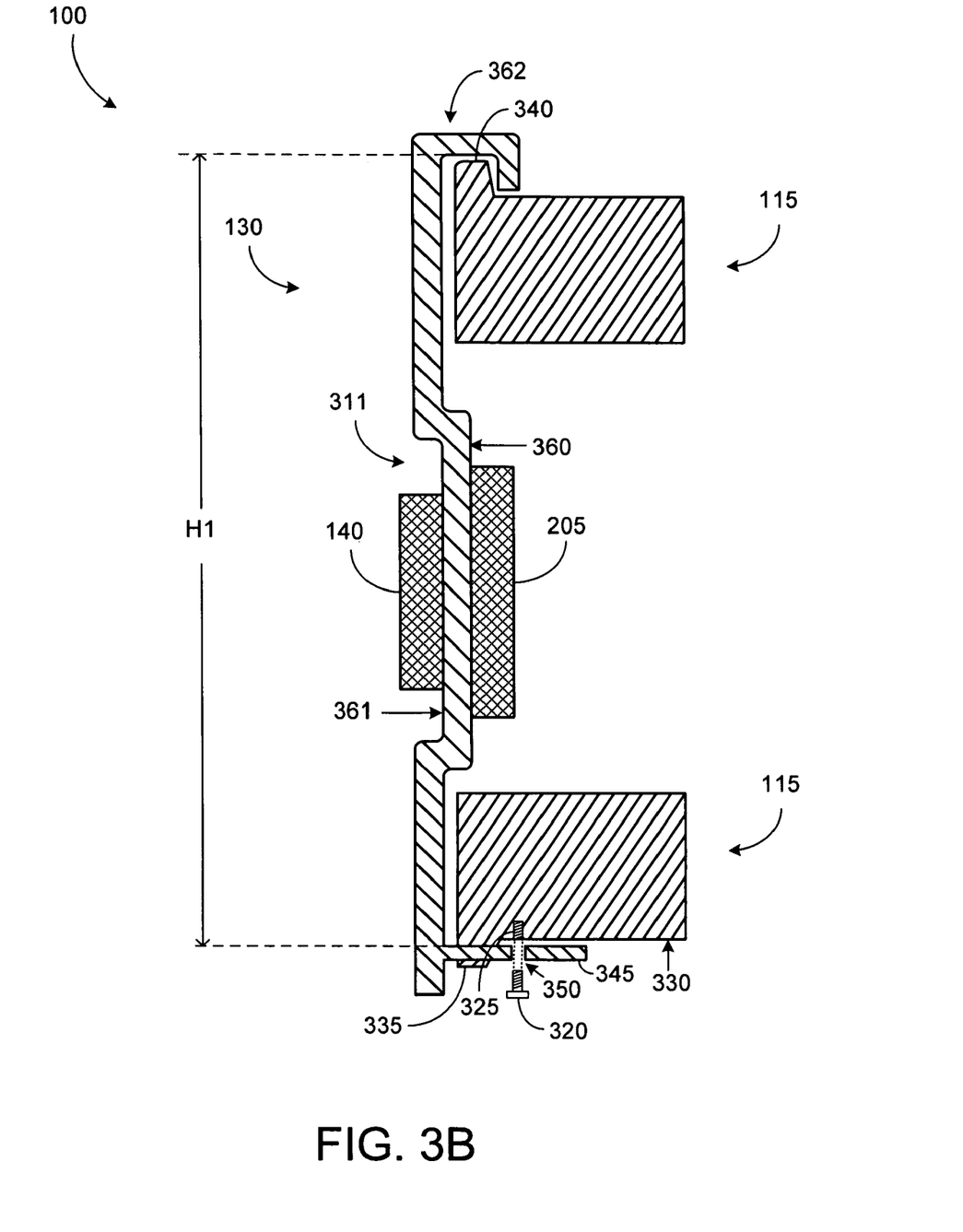
FIG. 3B shows a cross-sectional view of the metal plate of the RFID system of FIG. 3A mounted on the sideshifter.

FIG. 3B shows a cross-sectional view of RFID system 100 mounted on sideshifter 115, along the cross-section axis 3B-3B identified in FIG. 3A. Antenna assembly 140 is attached to mounting surface 361 of metal plate 130, and RFID tag reader module 205 is attached to an opposing mounting surface 360. In other embodiments, RFID tag reader module 205 and/or antenna assembly 140 are attached to various other surfaces and locations of metal plate 130.

The top portion of metal plate 130 is formed of an inverted J-shaped part 362 shaped to complement the shape of upper horizontal lip 340 of sideshifter 115. In preferred embodiments of the present invention, the inverted J-shaped part 362 can be an inverted J-shaped flange attached to the major surface of the metal plate, or an inverted J-shaped hook attached to the major surface of the metal plate. Shapes other than the inverted J-shape, an inverted semi-circular shape for example, may be used in other embodiments. It will be also understood that the term "inverted" as used in inverted J-shaped part, and other similar labels herein, refers to a vertical inversion whereby a "J" for example, is flipped upside-down.

A portion 311 of the major front surface of metal plate 130 is recessed so as to minimize the projection of antenna assembly 140 beyond a vertical plane defined by the front vertical surfaces 111a and 111b (shown in FIG. 3A) of forks 110a and 110b. In other embodiments, metal plate 130 can be shaped in various alternative forms such as a flat plate or a curved plate, for example.

Metal plate 130 further comprises a horizontal flange 345 located adjacent to a bottom edge of metal plate 130 and projecting orthogonally outwards with reference to the vertical plane of metal plate 130. Horizontal flange 345 has a width dimensioned to fit into a notch, which will be further described using FIG. 3C, located in the bottom horizontal member of sideshifter 115. Horizontal flange 345 also has a length dimensioned to cause horizontal flange 345 to protrude beyond a threaded aperture 325 in bottom surface 330 of the bottom horizontal member of sideshifter 115. Horizontal flange 345 further includes a hole, referred to for purposes of description as a slot 350 that is located in general alignment to threaded aperture 325. In one embodiment, slot 350 is a circular hole, while in another embodiment slot 350 is an oval-shaped hole. In yet another embodiment, slot 350 is a threaded hole. It will be understood that for purposes of description the terms "slot," "hole" and "aperture" may be used interchangeably and the nature of these terms are best understood in conjunction with the accompanying figures.

The vertical dimension, H1, of metal plate 130 measured between an inner surface of the inverted J-shaped part and the upper surface of horizontal flange 345 is approximately equal to the vertical dimension between a top surface of upper horizontal lip 340 and the bottom surface of lower horizontal lip 335.

The process of installing RFID system 100 upon sideshifter 115 is generally carried out by using the inverted J-shaped part to hang metal plate 130 from upper horizontal lip 340 of sideshifter 115. This step is followed by aligning horizontal flange 345 with threaded aperture 325, inserting a threaded bolt 320 through slot 350 of horizontal flange 345 and mating threaded bolt 320 with threaded aperture 325. Dismounting metal plate 130 from sideshifter 115 is generally carried out in reverse order to mounting metal plate 130 upon sideshifter 115.

Figure 3C:
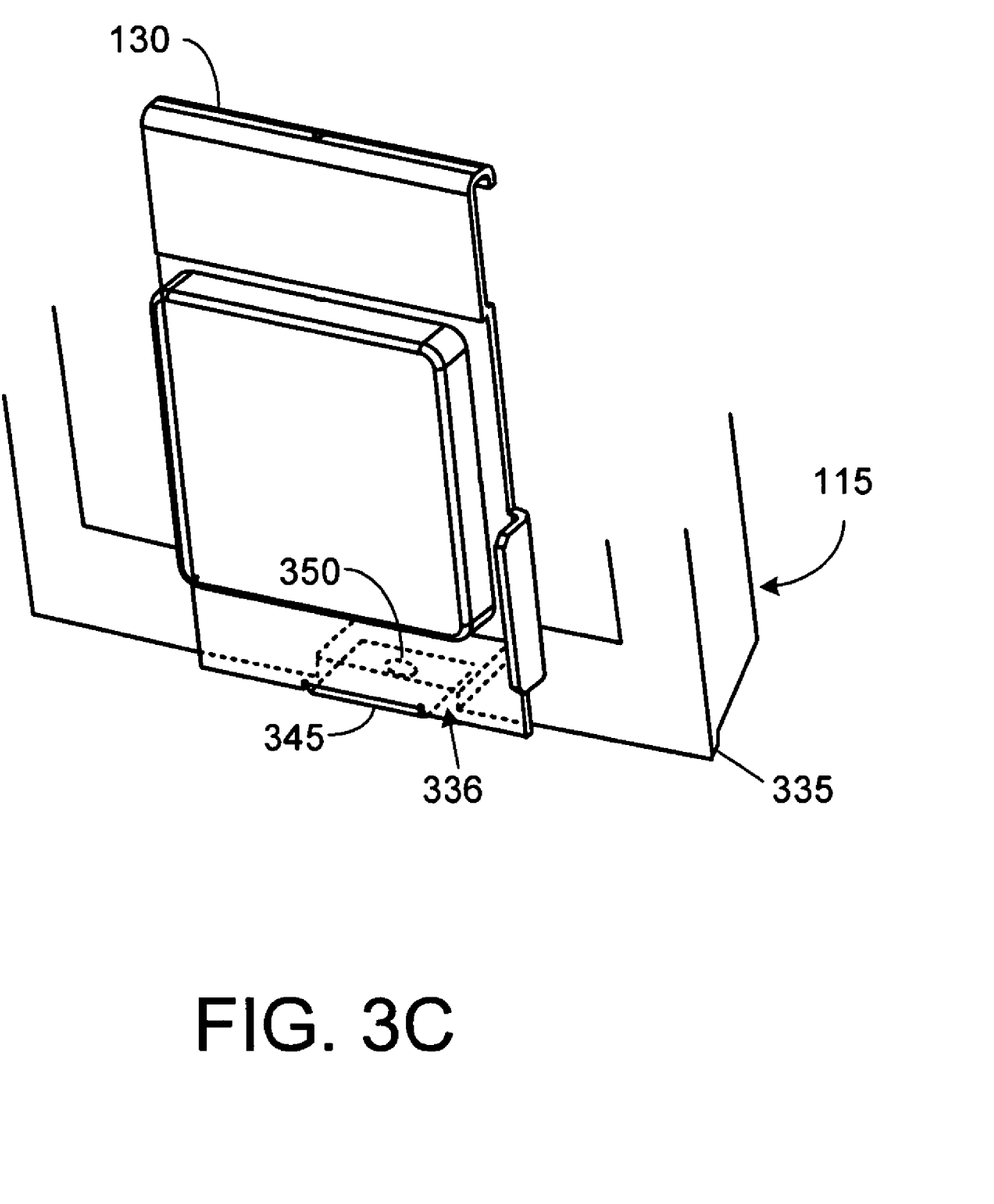
FIG. 3C shows a bottom attachment arrangement for the metal plate of the RFID system of FIG. 3A.

FIG. 3C shows a perspective view of a bottom edge of metal plate 130 containing flange 345 that is inserted into an OEM notch 336 located in lower horizontal lip 335 of sideshifter 115. As mentioned above, flange 345 constitutes one example of many, of the second projecting portion of metal plate 130. The second projecting portion is dimensioned to overlap at least a portion of a lower surface of lower horizontal lip 335 as exemplified by flange 345.

Figure 4A:
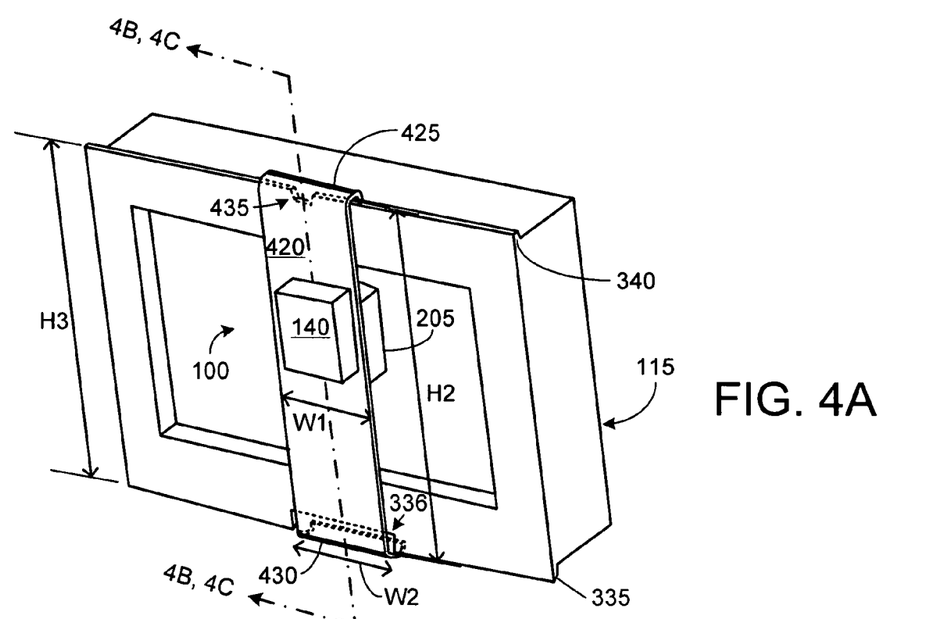
FIG. 4A shows a perspective view of a second exemplary embodiment of a metal plate, which is part of an RFID system in accordance with the invention.

FIG. 4A shows a first perspective view of RFID system 100 mounted on sideshifter 115 by using an alternative mounting system. In this example, the mounting system incorporates a mounting plate 420, which is shown located on sideshifter 115 in a first mounting position. Mounting plate 420 has a top portion formed of an inverted J-shaped part 425 shaped to be detachably mounted on upper horizontal lip 340 of sideshifter 115. Single mounting plate 420 further has a bottom portion formed of a J-shaped part 430 that is shaped to be removably attached to lower horizontal lip 335 of sideshifter 115. In preferred embodiments of the present invention, the J-shaped part 430 can be a J-shaped flange attached to the major surface of the metal plate, or a J-shaped hook attached to the major surface of the metal plate. Width W1 of single mounting plate 420 is selected to be less than width W2 of OEM notch 336 in lower horizontal lip 335 of sideshifter 115. However, width W1 is selected to be wider than the width of an OEM notch 435 that is present upon upper horizontal lip 340 of sideshifter 115.

Height H2 of single mounting plate 420 measured from the inside surface of inverted J-shaped part 425 to the inside surface of J-shaped part 430, is selected to be slightly greater than the height H3 of the front face of sideshifter 115. The height H3 of the front face of sideshifter 115 is measured from the top surface of upper horizontal lip 340 to the bottom surface of lower horizontal lip 335. The difference (H2-H3) is selected to provide a snug fit for detachably mounting single mounting plate 420 on sideshifter 115 without excessive play in the vertical direction when single mounting plate 420 is mounted as will be described below in further detail using FIGS. 4B-4E.

Figure 4B:
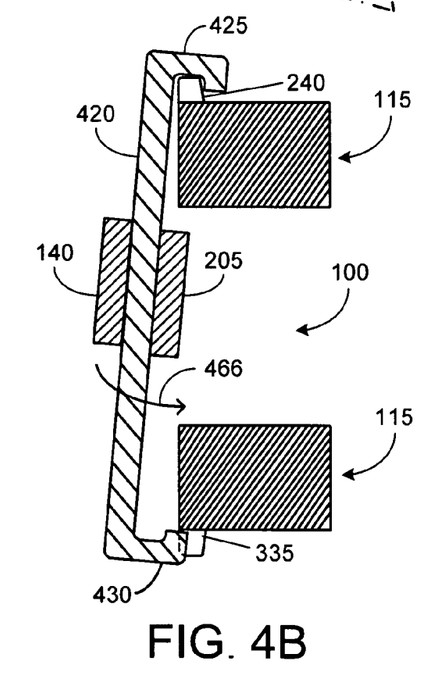
FIG. 4B shows a cross-sectional view of the metal plate of FIG. 4A to describe a method of mounting.
Figure 4C:
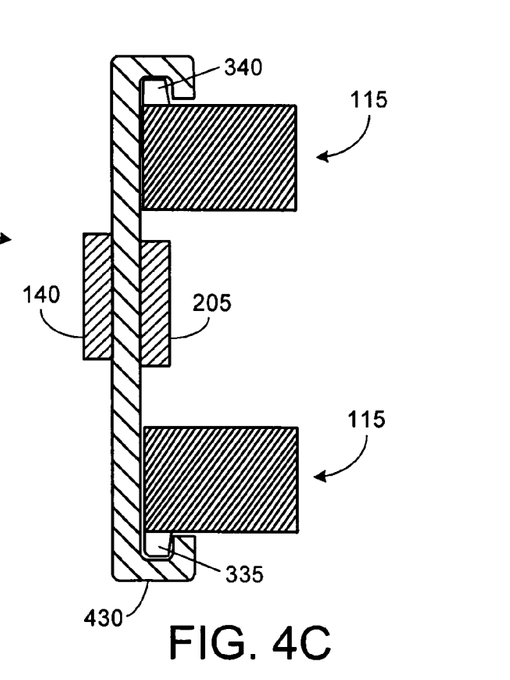
FIG. 4C shows another cross-sectional view of the metal plate of FIG. 4A to further describe the method of mounting.

A method of mounting single mounting plate 420 will be now described. FIGS. 4B and 4C are cross-sectional views along the (4B, 4C-4B, 4C) axis shown in FIG. 4A. The (4B, 4C-4B, 4C) axis is a vertical axis that is located in the horizontal center of OEM notch 336 as well as OEM notch 435.

Inverted J-shaped part 425 is mounted upon upper horizontal lip 340 with mounting plate 420 held at an angle such that J-shaped part 430 is aligned with OEM notch 336. Single mounting plate 420 is then swung in a direction indicated by arrow 466 such that J-shaped part 430 is inserted into OEM notch 336 of lower horizontal lip 335. FIG. 4C shows single mounting plate 420 with J-shaped part 430 inserted into OEM notch 336 and the major surfaces of single mounting plate 420 parallel to the vertical major surfaces of sideshifter 115. In this position, single mounting plate 420 is resting on upper horizontal lip 340 with J-shaped part 430 free-standing inside OEM notch 336.

Figure 4D:
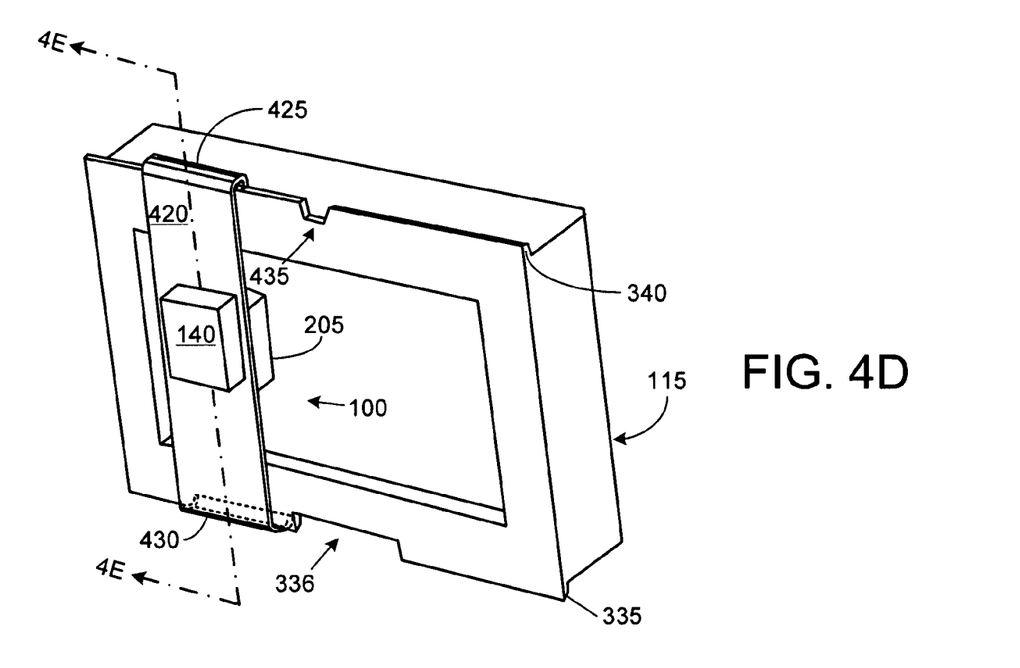
FIG. 4D shows a second perspective view of the metal plate of FIG. 4A in a second mounting position as a part of mounting the RFID system on the forklift.
Figure 4E:
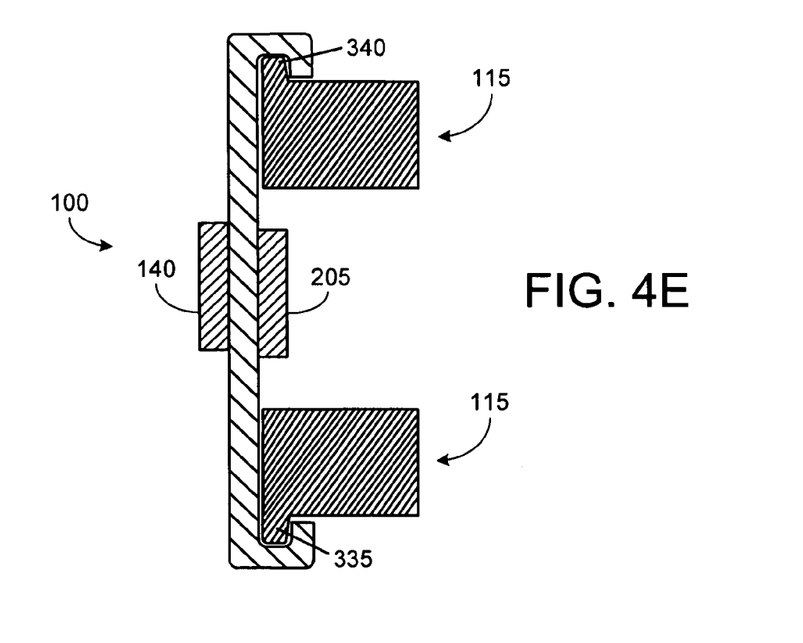
FIG. 4E shows a cross-sectional view of the metal plate of FIG. 4D to further describe the method of mounting.

After having been positioned as shown in FIG. 4C, single mounting plate 420 is then slid sideways away from OEM notch 336, whereby J-shaped part 430 engages the bottom surface of lower horizontal lip 335 as illustrated in FIG. 4D and the corresponding cross-sectional view (4E-4E) shown in FIG. 4E.

It will be understood that the mounting of single mounting plate 420 upon sideshifter 115 can be carried out without the requirement to dismantle a pair of tines (not shown) that may be pre-mounted on sideshifter 115. In certain aspects, the exemplary method described above for mounting RFID system 100 upon sideshifter 115 resembles a method of mounting a tine, such as fork 110a of FIG. 1, upon sideshifter 115. Consequently, this exemplary method of mounting RFID system 100 upon sideshifter 115 provides a number of advantages such as, ease of assembly, reduced training cost, and reduced mounting cost due in part to the absence of specific mounting hardware. The absence of specific mounting hardware allows RFID system 100 to be mounted on a forklift having an OEM sideshifter or an OEM carriage without excessive cost or effort.

Figure 4F:
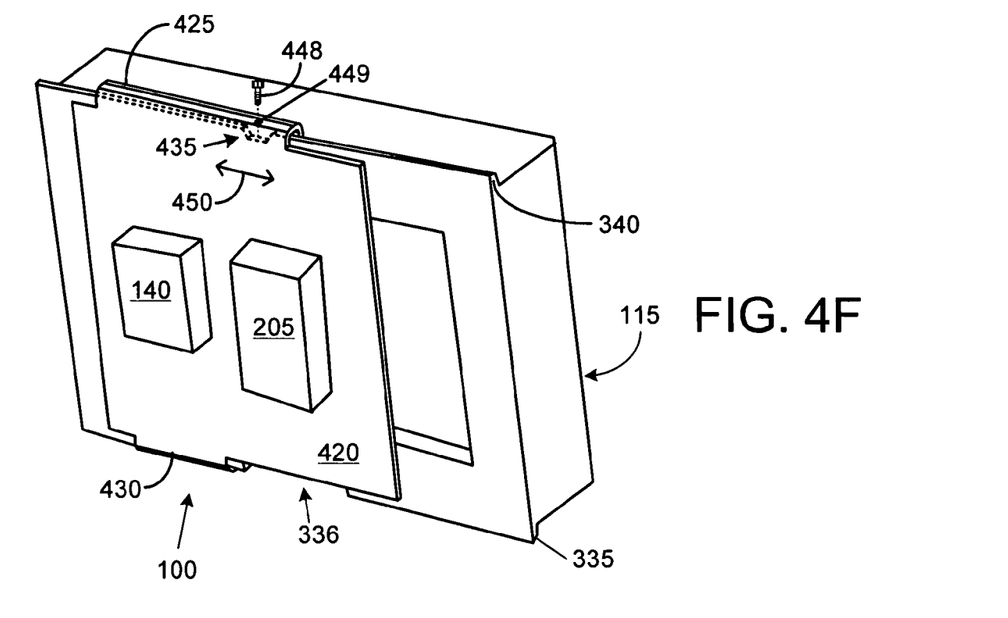
FIG. 4F shows a first exemplary variation in implementation of the metal plate of FIG. 4A.

FIG. 4F shows a first exemplary variation in implementation of mounting plate 420 used for mounting RFID system 100. In this exemplary implementation, inverted J-shaped part 425 and J-shaped part 430 are integral parts of a unitary mounting plate upon which is mounted RFID components. In this example, antenna assembly 140 and RFID tag reader module 205 are shown mounted on the same major front surface of mounting plate 420. The width of inverted J-shaped part 425 exceeds the width of J-shaped part 430. The widths are selected such that when J-shaped part 430 is positioned away from OEM notch 336, and consequently engaged with the bottom horizontal lip 335, inverted J-shaped part 425 covers notch 435 located on the upper horizontal lip 340. A set-screw 448 is inserted through a hole 449 located in inverted J-shaped part 425 and friction-tightened against the top surface of upper horizontal lip 340 inside notch 435. The set-screw operation prevents lateral displacement of single mounting plate 420 along the bi-directional, horizontal arrow 450 and thereby provides anchoring of single mounting plate 420 upon sideshifter 115 with minimal movement along horizontal as well as vertical directions.

Figure 4G:
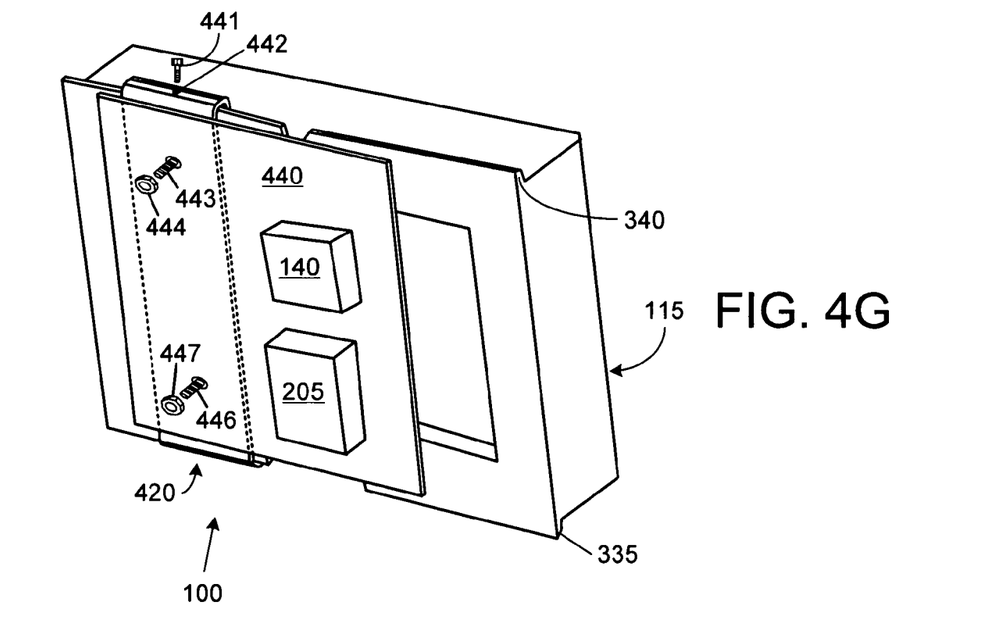
FIG. 4G shows a second exemplary variation in implementation of the metal plate of FIG. 4A.

FIG. 4G shows a second exemplary variation in implementation of mounting plate 420 used for mounting RFID system 100. In this implementation, mounting plate 420 has inverted J-shaped part 425 and J-shaped part 430. However, the RFID components are mounted on a secondary plate 440 that is detachably attached to single mounting plate 420 after single mounting plate 420 has been mounted on sideshifter 115. Single mounting plate 420 contains threaded bolts 443 and 446 that project orthogonally from a major surface of single mounting plate 420. While two such bolts are shown, it will be understood that a larger or smaller quantity of bolts maybe used.

A method of mounting this exemplary implementation of RFID system 100 will be described now. Single mounting plate 420 is first installed upon sideshifter 115 by employing the method described above with reference to FIGS. 4A-4E. A set-screw 441 may be optionally used to anchor single mounting plate 420 upon sideshifter 115 as shown in FIG. 4G. This is carried out by tightening set-screw 441 to form a friction fit with the upper surface of upper horizontal lip 340 or with an upper horizontal surface of sideshifter 115 located behind upper horizontal lip 340. Alternatively, set-screw 441 is mated with a threaded hole 442 that is provided on the upper horizontal surface of sideshifter 115.

Secondary plate 440 containing the RFID components, such as antenna assembly 140 and RFID tag reader module 205, is then placed upon single mounting plate 420 such that holes in secondary plate 440 are aligned with threaded bolts 443 and 446. Locknuts 444 and 447 are then employed to semi-permanently attach secondary plate 440 upon single mounting plate 420. The implementation of FIG. 4G permits easy dismounting of secondary plate 440 thereby allowing repair and/or replacement of one or more components of RFID system 100.

Figure 5:
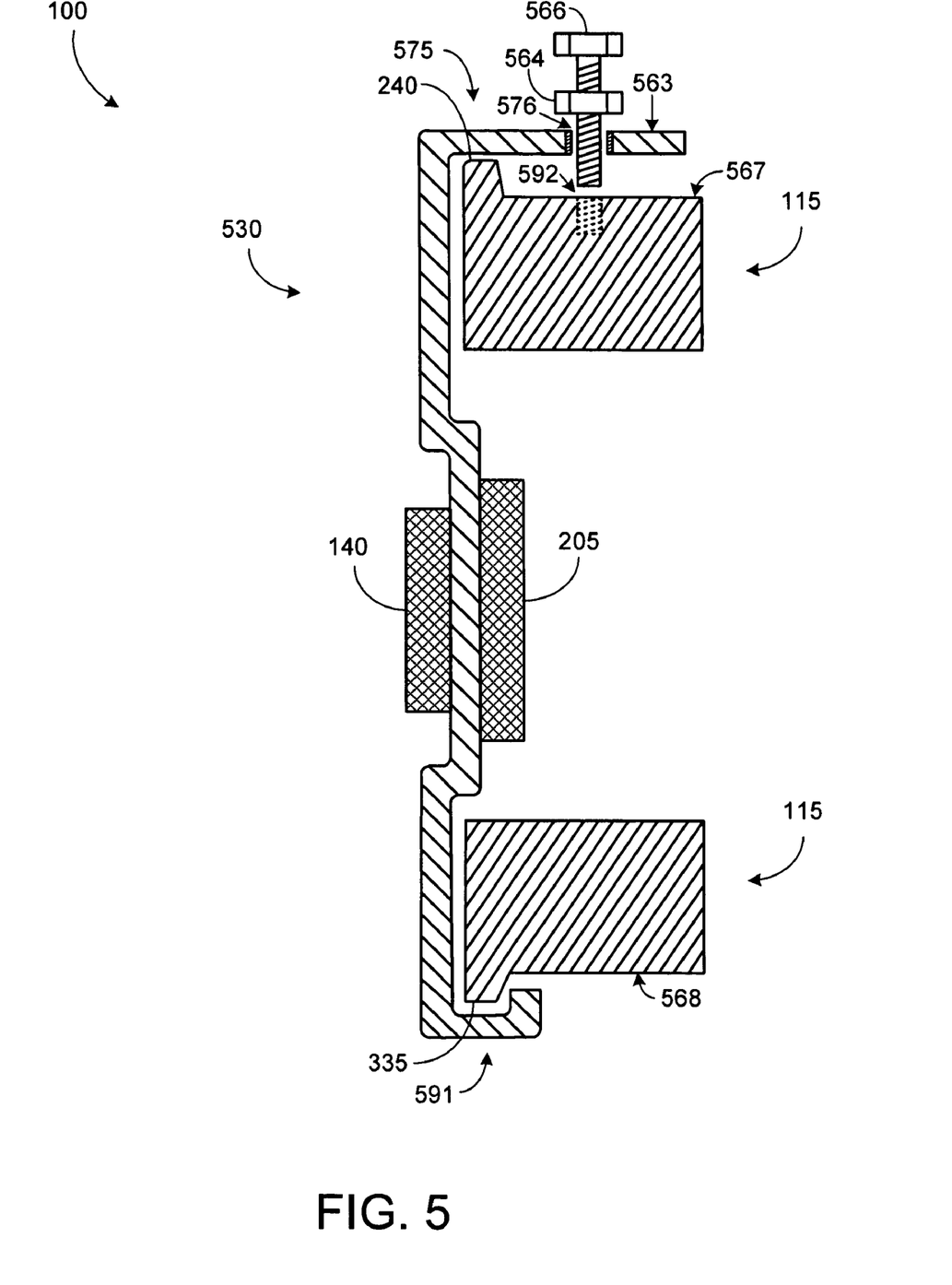
FIG. 5 shows a cross-sectional view of a third exemplary embodiment of a metal plate for mounting the RFID system upon the forklift.

FIG. 5 shows a cross-sectional view of a RFID system 100 incorporating yet another alternative embodiment of a metal plate 530. The top portion of metal plate 530 is formed of a projecting portion dimensioned to overlap at least a portion of an upper surface of upper horizontal lip 340. In this exemplary embodiment, the projecting portion is an inverted L-shaped part 575 that projects orthogonally away from a major vertical plane of metal plate 530. Inverted L-shaped part 575 includes a first threaded mounting hole 576 through which is inserted a first threaded bolt 566. Upon tightening threaded bolt 566, a lower end of threaded bolt 566 impacts upper surface 567 of the upper horizontal member of sideshifter 115 thereby applying pressure on inverted L-shaped part 575 in a vertical direction upwards. Nut 564 is a holding nut that is tightened once threaded bolt 566 is in a desired position. Threaded bolt 566 and nut 564 provide a set-screw functionality to metal plate 530.

In an alternative implementation, upper surface 567 contains a threaded hole 592, shown as a dotted outline. Threaded bolt 566 is inserted into the threaded hole 592 to anchor L-shaped part 575 upon sideshifter 115. It will be understood that one or more of the features described above, such as the threaded hole 592 extending inwards from surface 567, threaded mounting hole 576, and nut 564 may be used individually or in one or more combinations in various implementations.

The bottom portion of metal plate 530 is formed of a J-shaped part 591 that engages lower horizontal lip 335. Upon tightening threaded bolt 566, a lower end of threaded bolt 566 impacts upper surface 567, or engaged into threaded hole 592, of the upper horizontal member of sideshifter 115 thereby applying pressure on inverted L-shaped part 575 in a vertical direction upwards. This action causes J-shaped part 591 to also move upwards thereby engaging tighter with lower horizontal lip 335.

Figure 6:
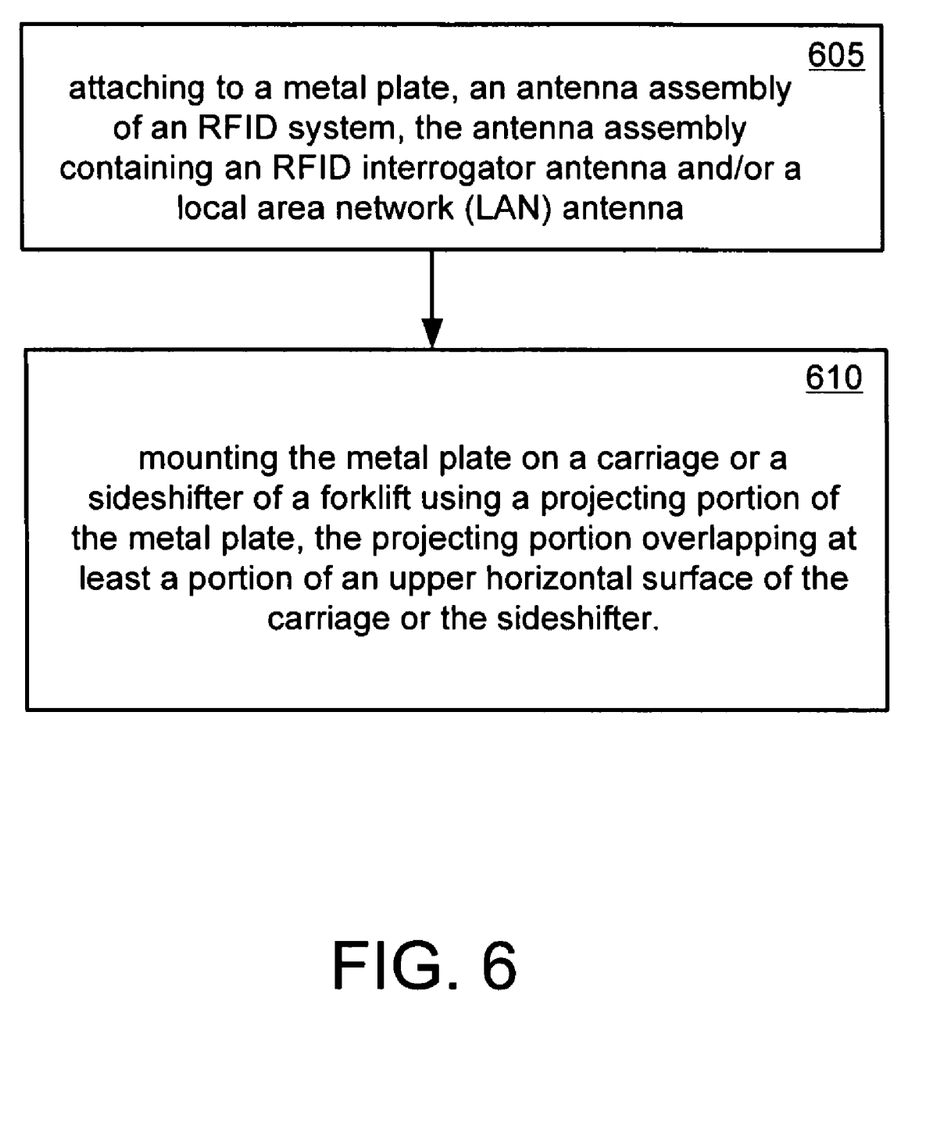
FIG. 6 is a flowchart of an exemplary method of mounting an RFID system on a forklift.

FIG. 6 is a flowchart of an exemplary method of mounting an RFID system on a forklift. In block 605, an antenna assembly of the RFID system containing an RFID interrogator antenna or/and a wireless local area network (WLAN) antenna is attached to a metal plate. In block 610, the metal plate is mounted on a carriage or a sideshifter of the forklift using a projecting portion of the metal plate. The first projecting portion overlaps at least a portion of an upper horizontal surface when the metal plate is mounted on either the carriage or the sideshifter.

The above-described embodiments are merely set forth for a clear understanding of the principles of the disclosure. Many variations and modifications may be made without departing substantially from the disclosure. All such modifications and variations are included herein within the scope of this disclosure.

We claim:

1. A radio frequency identification (RFID) system for a forklift, the system comprising:
   a metal plate;
   an electronic circuit assembly attached to the metal plate; and
   an antenna assembly comprising at least one of an RFID interrogator antenna and a wireless local area network (WLAN) antenna, the antenna assembly attached to the metal plate whereby the metal plate is operative as a ground plane of the antenna assembly and is further operative as a mounting plate for mounting the RFID system on one of a carriage and a sideshifter of the forklift.

2. The RFID system of claim 1, wherein the metal plate comprises a first projecting portion configured to overlap at least a portion of an upper horizontal surface of the at least one of the carriage and the sideshifter of the forklift when the metal plate is mounted on the at least one of the carriage and the sideshifter of the forklift.

3. The RFID system of claim 2, wherein the metal plate further comprises a second projecting portion configured to overlap at least a portion of a lower horizontal surface of the at least one of the carriage and the sideshifter of the forklift when the metal plate is mounted on the carriage of the forklift.

4. The RFID system of claim 3, wherein the second projecting portion comprises at least one of a) a planar flange projecting orthogonally to a major surface of the metal plate, b) a J-shaped edge of the metal plate, c) a J-shaped flange attached to the major surface of the metal plate, and d) a J-shaped hook attached to the major surface of the metal plate.

5. The RFID system of claim 4, wherein the second projecting portion contains an opening through which is inserted a threaded bolt operative to be mated with a threaded aperture located in the lower horizontal surface of the at least one of the carriage and the sideshifter of the forklift.

6. The RFID system of claim 5, wherein the at least one of the carriage and the sideshifter is an unmodified original equipment manufacture (OEM) component of the forklift.

7. The RFID system of claim 2, wherein the metal plate is mounted between a pair of forks of the forklift.

8. The RFID system of claim 7, wherein the mounting is carried out by using a unitary anchoring device to anchor the metal plate to the at least one of the carriage and the sideshifter of the forklift.

9. The RFID system of claim 8, wherein the unitary anchoring device is a bolt that is inserted through an opening in the first projecting portion of the metal plate to make contact with the upper horizontal surface of the at least one of the carriage and the sideshifter of the forklift, the bolt being operative to be friction-fit tightened against the upper horizontal surface.

10. The RFID system of claim 7, wherein the mounting is carried out by mating the first projecting portion of the metal plate to an upper horizontal lip of the at least one of the carriage and the sideshifter of the forklift, the first projecting portion being shaped to conformably mate with the upper horizontal lip.

11. The RFID system of claim 7, wherein the electronic circuit assembly comprises an RFID tag reader attached to a first major surface of the metal plate and the antenna assembly is attached to a second major surface opposing the first major surface of the metal plate, the antenna assembly being electrically coupled to the RFID tag reader through an opening in the metal plate.

12. The RFID system of claim 7, wherein the antenna assembly comprises a housing that encloses and mechanically protects the RFID interrogator antenna and the wireless local area network (WLAN) antenna, the housing being transparent to radio frequency (RF) signals.

13. The RFID system of claim 12, wherein the electronic circuit assembly faces the chassis of the forklift and the antenna assembly faces away from the chassis of the forklift, whereby the electronic circuit assembly is protected from impact by a foreign object.

14. The RFID system of claim 2, wherein the first projecting portion comprises at least one of a) a planar flange projecting orthogonally to a major surface of the metal plate, b) an inverted J-shaped edge of the metal plate, c) an inverted J-shaped flange attached to the major surface of the metal plate, and d) an inverted J-shaped hook attached to the major surface of the metal plate.

15. A method of mounting an RFID system on a forklift, the method comprising:
providing a metal plate;
attaching to the metal plate, an antenna assembly of the RFID system, the antenna assembly containing at least one of an RFID interrogator antenna and a wireless local area network (WLAN) antenna; and
mounting the metal plate on one of a carriage and a sideshifter of the forklift using a first projecting portion of the metal plate, the first projecting portion configured to overlap at least a portion of an upper horizontal surface of the at least one of the carriage and the sideshifter of the forklift when the metal plate is mounted on the at least one of the carriage and the sideshifter of the forklift.

16. The method of claim 15, further comprising mounting the metal plate on one of a carriage and a sideshifter of the forklift using a second projecting portion of the metal plate, the second projecting portion configured to overlap at least a portion of a lower horizontal surface of the at least one of the carriage and the sideshifter of the forklift when the metal plate is mounted on the at least one of the carriage and the sideshifter of the forklift.

17. The method of claim 16, further comprising:
inserting a threaded bolt through a hole in the first projecting portion; and
anchoring the metal plate to the at least one of the carriage and the sideshifter of the forklift by tightening the threaded bolt against the upper horizontal surface of the at least one of the carriage and the sideshifter of the forklift.

18. The method of claim 16, further comprising:
inserting a threaded bolt through a hole in the first projecting portion; and
mating the threaded bolt to an OEM threaded aperture located in the upper horizontal surface of the at least one of the carriage and the sideshifter of the forklift.

19. The method of claim 16, further comprising:
inserting a threaded bolt through the second projecting portion; and
mating the threaded bolt to an OEM threaded aperture located in the lower horizontal surface of the at least one of the carriage and the sideshifter of the forklift.

20. A radio frequency identification (RFID) system for a forklift, the system comprising:
a metal plate having a first horizontally projecting portion projecting orthogonally to a major plane of the metal plate, the metal plate adapted for mounting the RFID system on one of a carriage and a sideshifter of the forklift using the first projecting portion that is configured to overlap at least a portion of an upper horizontal surface of the one of a carriage and a sideshifter of the forklift between a pair of forks of the forklift.

21. The RFID system of claim 20, further comprising:
an electronic circuit assembly mounted on a first major surface of the metal plate; and
an antenna assembly comprising at least one of an RFID interrogator antenna and a wireless local area network (WLAN) antenna, the antenna assembly attached to a second major surface opposite the first major surface of the metal plate.

22. The RFID system of claim 21, wherein the metal plate further comprises a recessed portion and the antenna assembly is located in the recessed portion.

23. The RFID system of claim 22, wherein the metal plate further comprises an opening through which is inserted a connecting cable that connects the RFID interrogator antenna to a component of the electronic circuit assembly.

24. The RFID system of claim 23, wherein the RFID system further comprises a sensor mounted on the metal plate, the sensor configured to detect the presence of an object placed on the pair of forks of the forklift.

25. The RFID system of claim 20, wherein a height of the metal plate exceeds a width of the metal plate.

26. The RFID system of claim 25, wherein the height of the metal plate exceeds two times the width of the metal plate.

27. The RFID system of claim 20, wherein the metal plate is operative as a lid of at least one of the electronic circuit assembly and the antenna assembly.

* * * * *